United States Patent
Park et al.

(10) Patent No.: US 7,522,818 B2
(45) Date of Patent: *Apr. 21, 2009

(54) DATA STORAGE MEDIUM IN WHICH MULTIPLE BITSTREAMS ARE RECORDED, APPARATUS AND METHOD FOR RECORDING THE MULTIPLE BITSTREAMS, AND APPARATUS AND METHOD FOR REPRODUCING THE MULTPLE BITSTREAMS

(75) Inventors: Sung-wook Park, Seoul (KR); Hee-soo Lee, Gyeonggi-do (KR); Bong-gil Bak, Seoul (KR); Hyun-kwon Chung, Gyeonggi-do (KR); Tae-yun Chung, Kangwon-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 1140 days.

This patent is subject to a terminal disclaimer.

(21) Appl. No.: 09/981,288

(22) Filed: Oct. 18, 2001

(65) Prior Publication Data

US 2002/0106193 A1 Aug. 8, 2002

(30) Foreign Application Priority Data

Feb. 5, 2001 (KR) .......................... 2001-0005374

(51) Int. Cl.
*H04N 5/76* (2006.01)
*H04N 7/00* (2006.01)

(52) U.S. Cl. .......................................... 386/95; 386/98

(58) Field of Classification Search ................. 386/1, 386/82, 124, 125
See application file for complete search history.

(56) References Cited

U.S. PATENT DOCUMENTS

| | | | | |
|---|---|---|---|---|
| 5,930,450 A | * | 7/1999 | Fujita | 386/95 |
| 5,949,752 A | * | 9/1999 | Glynn et al. | 369/275.3 |
| 5,963,703 A | * | 10/1999 | Higurashi et al. | 386/75 |

(Continued)

FOREIGN PATENT DOCUMENTS

CN 1146902 C 4/2004

(Continued)

OTHER PUBLICATIONS

European Search Report dated Jun. 23, 2005, in corresponding European Patent Divisional Application No. 05076073.5.

(Continued)

*Primary Examiner*—Thai Tran
*Assistant Examiner*—Gelek Topgyal
(74) *Attorney, Agent, or Firm*—Stein, McEwen & Bui, LLP

(57) ABSTRACT

A data storage medium in which multiple bitstreams are recorded, an apparatus and method for recording the multiple bitstreams, and an apparatus and method for reproducing the multiple bitstreams are provided. The reproducing apparatus includes: a reading unit for reading main data including audio data and/or video data, and reading sub data recorded in a separate bitstream from the main data, which is later reproduced in synchronization with the main data; and a multiplexer for multiplexing the main data and sub data read by the reading unit. Therefore, multiple bitstreams can be read and reproduced at the same time.

17 Claims, 9 Drawing Sheets

U.S. PATENT DOCUMENTS

| | | | |
|---|---|---|---|
| 6,088,507 A * | 7/2000 | Yamauchi et al. | 386/95 |
| 6,115,077 A * | 9/2000 | Tsukagoshi | 348/607 |
| 6,191,900 B1 * | 2/2001 | Higurashi et al. | 360/18 |
| 6,230,172 B1 * | 5/2001 | Purnaveja et al. | 715/512 |
| 6,493,038 B1 | 12/2002 | Singh et al. | |
| 6,493,048 B1 * | 12/2002 | Baek et al. | 349/43 |
| 6,724,434 B1 * | 4/2004 | Aaltonen | 348/565 |
| 6,763,178 B1 * | 7/2004 | Suzuki et al. | 386/95 |
| 6,784,945 B2 * | 8/2004 | Norsworthy et al. | 348/731 |
| 6,788,710 B1 | 9/2004 | Knutson et al. | |

FOREIGN PATENT DOCUMENTS

| | | |
|---|---|---|
| EP | 797 196 | 9/1997 |
| EP | 0 831 647 A1 | 3/1998 |
| EP | 831 647 | 3/1998 |
| EP | 0 913 822 A2 | 5/1999 |
| EP | 913 822 | 5/1999 |
| JP | 10-106151 | 4/1998 |
| JP | 11-144378 | 5/1999 |
| JP | 11-177934 | 7/1999 |
| JP | 11-259930 | 9/1999 |
| JP | 11-298845 | 10/1999 |
| JP | 2000-83216 | 2/2000 |
| JP | 2000-083216 | 3/2000 |
| KR | 2000-77406 | 12/2000 |
| WO | WO 00/05890 | 2/2000 |

OTHER PUBLICATIONS

Japanese Office Action dated Jul. 12, 2005, issued in corresponding Japanese Patent Divisional Application No. 2004-206167.
Office Action issued in Chinese Patent Application No. 01130289.5 on Sep. 9, 2005.
Austrian Search Report issued in Singapore Patent Application No. 200107684-3 on Dec. 30, 2004.
Office Communication issued in European Patent Application No. 01310666.1 dated Feb. 2, 2006.
"W3C Synchronized Multimedia Integration Language (SMIL) 1.0 Specification", Jun. 15, 1998 (1 page).
"Using Philips SVCD Designer", May 2, 2005 (5 pages).
Sugiyama et al., "Elements of a New Authoring System for Digital Video Disk (DVD)", *SMPTE Journal*, Nov. 1997, pp. 762-767.
Search Report issued in the Japanese Patent Application No. 2006-116125 on Aug. 22, 2006.
Korean Office Action issued on Nov. 25, 2002, in Korean Patent Application No. 2001-5374 (in Korean with English translation).
European Search Report issued on Nov. 28, 2003, in European Patent Application No. 0131066.1.
Japanese Office Action issued on Apr. 13, 2004, in Japanese Patent Application No. 2001-398557 (in Japanese, no English translation).
Japanese Office Action issued on Aug. 31, 2004, in Japanese Patent Application No. 2001-398557 (in Japanese, no English translation).

* cited by examiner

FIG. 1

MAIN DATA

SUB DATA

EXTRA DATA

DATA STORAGE MEDIUM IN WHICH MULTIPLE BITSTREAMS ARE RECORDED, APPARATUS AND METHOD FOR RECORDING THE MULTIPLE BITSTREAMS, AND APPARATUS AND METHOD FOR REPRODUCING THE MULTPLE BITSTREAMS

CROSS-REFERENCE TO RELATED APPLICATIONS

This application claims the benefit of Korean Patent Application No. 2001-5374 filed on Feb. 5, 2001, in the Korean Intellectual Property Office.

BACKGROUND OF THE INVENTION

1. Field of the Invention

The present invention relates to the field of recording and reproducing multiple bitstreams, and more particularly, to a data storage medium in which multiple bitstreams are recorded for multimedia data services, an apparatus and method for recording the multiple bitstreams, and an apparatus and method for reproducing the multiple bitstreams.

2. Description of the Related Art

In conventional multi-media data storage media, different kinds of data such as video data, audio data, and/or extra data including text data are recorded in a multiplexed single bitstream. Recording apparatuses for recording multimedia data record various Kinds of data that constitute multimedia data in a single bitstream by multiplexing. Accordingly apparatuses for reproducing multimedia data have only a function of reading and reproducing a single bitstream.

Therefore, when there is a need to replace a part of a bitstream recorded by multiplexing, first the multiplexed bitstream is read. Then, the part of the bitstream is replaced with new data, and the entire bitstream is recorded again. For example, when a user intends to replace an English caption recorded in a multimedia movie with a Japanese one, the bitstream of the movie is read and recorded again after replacing English caption data included in the bitstream with Japanese caption data. Furthermore, when the user wishes to restore the Japanese caption to the English caption, the English caption data, which was reserved for backup previously, is restored in the same process as for the Japanese caption replacement.

In addition, when there is a need to insert a caption into a recorded movie, the bitstream of the movie is read, multiplexed together with caption data to insert the caption, and recorded again. These processes are relatively burdensome.

SUMMARY OF THE INVENTION

To solve the above-described problems, it is a first object of the present invention to provide a data storage medium in which various kinds of data constituting multimedia contents are recorded in discrete bitstreams for easy editing and replacement with other data, and an apparatus and method for recording data in multiple bitstreams in a data storage medium.

It is a second object of the present invention to provide an apparatus and method for reproducing data by simultaneously reading multiple bitstreams.

To achieve the first object of the present invention, there is provide a data storage medium comprising: main data including audio data and/or video data; sub data recorded in a separate bitstream from the main data and reproduced in synchronization with the main data; and navigation information defining a relation required for the main date and the sub data to be output in synchronization with each other.

It is preferable that the data storage medium further comprises extra data recorded in a separate bitstream from the main data and the sub data and reproduced in association with the main data. In this case, the navigation information may further define a relation required for the main data and the extra data to be output in connection with each other.

It is preferable that the main data, the sub data and/or the extra data are Input through a digital Interface and recorded.

To achieve the first object of the present invention, there is also provided a recording method comprising: (a) recording main data including audio data and/or video data; (b) recording sub data to be reproduced in synchronization with the main data in a separate bitstream from the main data; and (c) recording navigation information defining a relation required for the main data and the sub data to be reproduced in synchronization with each other.

Preferably, the recording method further comprises: (d) recording extra data to be reproduced in connection with the main data in a separate bitstream from the main data and the sub data; and (e) recording navigation information defining a relation required for the main data and the extra data to be output in connection with each other.

It is preferable that step (a) comprises: (a1) receiving the main data through a digital interface; and (a2) recording the received main data.

It is preferable that step (b) comprises: (b1) receiving the sub data through the digital interface; and (b2) recording the received sub date, It is preferable that step (c) comprises: (c1) receiving the extra data through the digital interface; and (c2) recording the received extra data.

To achieve the second object of the present invention, there is provided a reproducing method comprising: (a) reading main data including audio data and/or video data; (b) reading sub data recorded in a separate bitstream from the main data, which is later reproduced in synchronization with the main data; and (c) multiplexing the read main data and the read sub data.

It is preferable that the reproducing method further comprises (d1) outputting the multiplexed main data and sub data through a digital interface, or (d2) decoding the multiplexed main data and sub data.

In the reproducing method, it is preferable that step (c) comprises: (c1) reading navigation Information defining a relation required for the read main data and sub data to be reproduced in synchronization with each other; and (c2) multiplexing the read main data and the read sub data based upon the navigation information, Alternatively, another reproducing method according to the present invention comprises: (a) reading main data including audio data and/or video data; (b) reading sub data recorded in a separate bitstream from the main data, which is later reproduced in synchronization with the main data; (c) reading extra data recorded in a separate bitstream from the main data and the sub data, which is later reproduced in connection with the main data; and (d) multiplexing the read main data, the read sub data, and the read extra data.

In this embodiment, the reproducing method preferably further comprises (e1) outputting the multiplexed main data, sub data, and extra data through a digital interface, or (e2) decoding the multiplexed main data, sub data, and extra data.

In the reproducing method above, it is preferable that step (d) comprises: (d1) reading navigation information defining a relation required for the read main data and sub data to be reproduced in synchronization with each other and for the read main data and extra data to be reproduced in connection with each other; and (d2) multiplexing the read main date, the road sub data, and the read extra data based upon the navigation information.

Another embodiment of the reproducing method according to the present invention comprises, (a) reading sub data recorded in a separate bitstream from main data including audio data and/or video data, which is later reproduced in synchronization with the main data; (b) reading extra data recorded in a separate bitstream from the main data and the sub data, which is later reproduced in connection with the main data; and (c) multiplexing the read sub data and the read extra data.

In this embodiment, it is preferable that the reproducing method further comprises (d1) outputting the multiplexed sub data and extra data through a digital interface, or (d2) decoding the multiplexed sub data and extra data.

In the reproducing method above, it is preferable that step (c) comprises: (c1) reading navigation information defining a relation required for the read sub data and extra data to be reproduced in connection with each other; and (c2) multiplexing the read sub data and the extra data based upon the navigation information.

The first object of the present invention is also achieved by a recording apparatus comprising; a recording unit for recording main data including audio data and/or video data, recording sub data to be reproduced in synchronization with the a main data in a separate bitstream from the main data, and recording navigation information defining a relation required for the main data and the sub date to be reproduced in synchronization with each other; and a control unit for generating the navigation information and providing the generated navigation information to the recording unit.

It is preferable that the recording unit further records extra data to be reproduced in connection with the main data in a separate bitstream from the main data and the sub data, and records navigation information defining a relation required for the main data and the extra data to be reproduced in connection with each other. In this case, the control unit preferably generates the navigation information defining the relation between the main data and the extra data and provides the generated navigation data to the recording unit.

It is preferable that the recording apparatus further comprises a digital interface for receiving the main data and/or the sub data, and the digital interface receives the extra data, and the recording unit records the received extra data and navigation information on the extra data.

It is preferable that the recording apparatus further comprises an encoder for receiving and encoding the main data and/or the sub data.

The second object of the present invention is also achieved by a reproducing apparatus comprising: a reading unit for reading main data including audio data and/or video data and reading sub data recorded in a separate bitstream from the main data, which is later reproduced in synchronization with the main date; and a multiplexer for multiplexing the main data and sub data read by the reading unit.

It is preferable that the reproducing apparatus further comprises a digital interface for outputting the multiplexed main data arid sub data, or a decoder for decoding the multiplexed main data and sub data.

In the reproducing apparatus, it is preferable that the reading unit roads navigation information defining a relation required for the read main data and sub data to be reproduced in synchronization with each other, and the multiplexer multiplexes the read main data and the read sub data based upon the navigation information.

To achieve the second object of the present invention, there is also provided a reproducing apparatus comprising: a reading unit for reading main data including audio data and/or video data, reading sub data recorded in a separate bitstream from the main data, which is later reproduced in synchronization with the main data, and reading extra data recorded in a separate bitstream from the main data and the sub data, which is later reproduced in connection with the main data; and a multiplexer for multiplexing the main data, sub data, and extra data read by the reading unit.

It is preferable that the reproducing apparatus above further comprises a digital interface for outputting the multiplexed main data, sub data, and extra data, or a decoder for decoding the multiplexed main data, sub data, and main data.

In the reproducing apparatus above, it is preferable that the reading unit reads navigation information defining a relation required for the read main data and sub data to be reproduced in synchronization with each other and required for the read main data and extra data to be reproduced in connection with each other, and the multiplexer multiplexes the read main data, the read sub data, and the read extra data based upon the navigation information.

Another reproducing apparatus according to the present invention comprises: a reading unit for reading sub data recorded in a separate bitstream from main data including audio data and/or video data, which is later reproduced in synchronization with the main data, and reading extra data recorded in a separate bitstream from the main data and the sub data, which is later reproduced in connection with the main data; and a multiplexer for multiplexing the sub data and extra data read by the reading unit.

It is preferable that the reproducing apparatus above further comprises a digital interface for outputting the multiplexed sub data and extra data, or a decoder for decoding the multiplexed sub data and extra data.

In the reproducing apparatus above, it is preferable that the reading unit reads navigation information defining a relation required for the sub data and the extra data to be reproduced in connection with each other, and the multiplexer multiplexes the read sub data and the read extra data based upon the navigation information.

BRIEF DESCRIPTION OF THE DRAWINGS

The above objects and advantages or the present invention will become more apparent by describing in detail preferred embodiments thereof with reference to the attached drawings in which:

FIG. 1 shows an example of data recorded on an optical disc according to a preferred embodiment of the present invention;

DETAILED DESCRIPTION OF THE INVENTION

Figure 1:
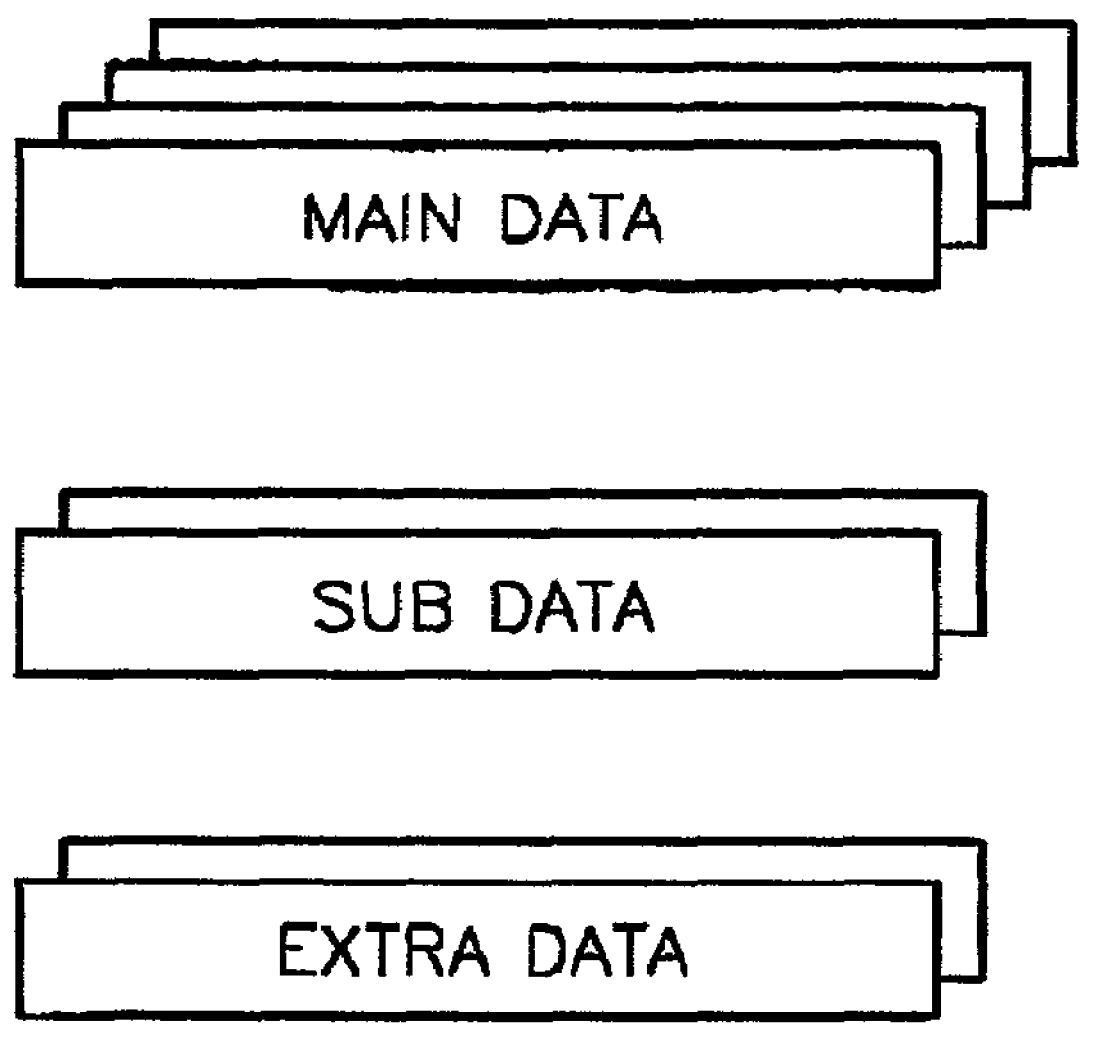

An example of data recorded in an optical disc according to a preferred embodiment of the present invention is shown in FIG. 1. Referring to FIG. 1, main data, sub data, and extra data are recorded in the optical disc in separate bitstreams. Here, the main data have corresponding sub data and extra data. However, not all the main data have corresponding sub data and/or corresponding extra data.

Main data refer to data that can be independently reproduced. For example, a movie including both video data and audio data may be a kind of main data. Sub data refers to additional data to main data, which contains components to be reproduced in synchronization with the main data. For example, sub-picture data to be reproduced as caption data along with video data recorded in a digital versatile disc may be a kind of sub data. Extra data refers to additional data associated with main data, including an Internet link with respect to a particular scene of a movie, a movie script, an actor's profile, and a bonus clip. Extra data are, but not necessarily, reproduced in synchronization with main data.

Sub data and/or extra data corresponding to main data can be recorded along with the main data at the same time or sequentially with a time gap. When the sub data and/or extra data and main data are recorded at the same time, a recording unit of an optical pickup alternately records the main data and corresponding sub data and/or extra data.

Although sub data and/or extra data are generally reproduced in synchronization with main data, the sub data and/or extra data may be reproduced separately from corresponding main data. For example, only a sound track recorded as sub data of a movie, and/or only a movie script recorded as extra data of the movie, may be output.

Figure 2:
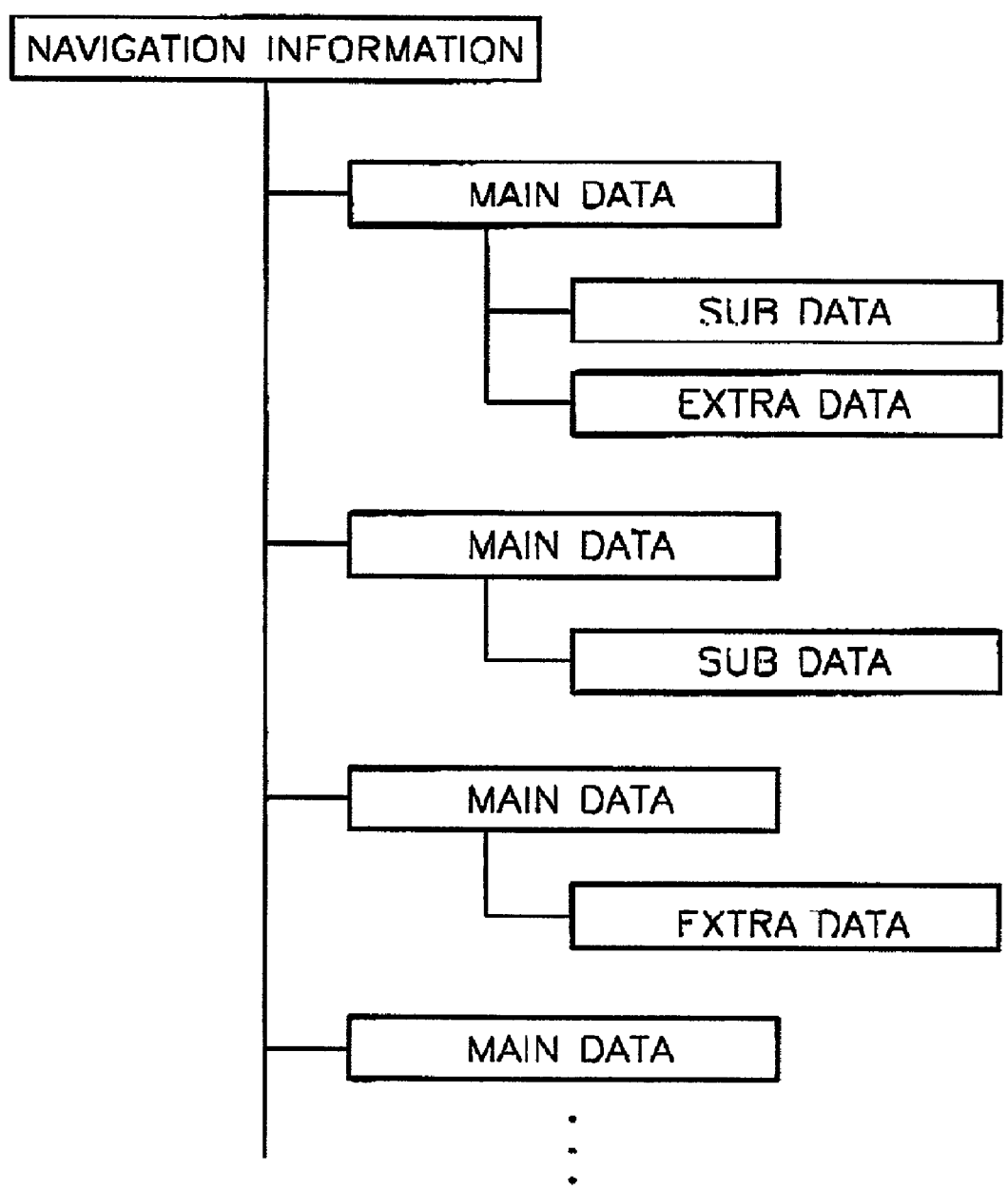
FIG. 2 shows the structure of navigation information showing the relation between main data, sub data, and extra data of FIG. 1.

FIG. 2 shows the structure of navigation information showing the relation between the main data, sub data, and extra data of FIG. 1. Navigation information refers to control information required for easy searching and controlling multimedia contents stored in storage media including digital versatile discs (DVDs), Referring to FIG. 2, main data are associated with at least one sub data and/or extra data. The main data on the top of the structural diagram of FIG. 2 have one sub data and one extra data as additional data, next main data have only sub data as additional data, and next main data have only extra data as additional data.

In particular, navigation information includes identifiers for particular bitstreams and playback time information on additional data corresponding to main data.

Figure 3:
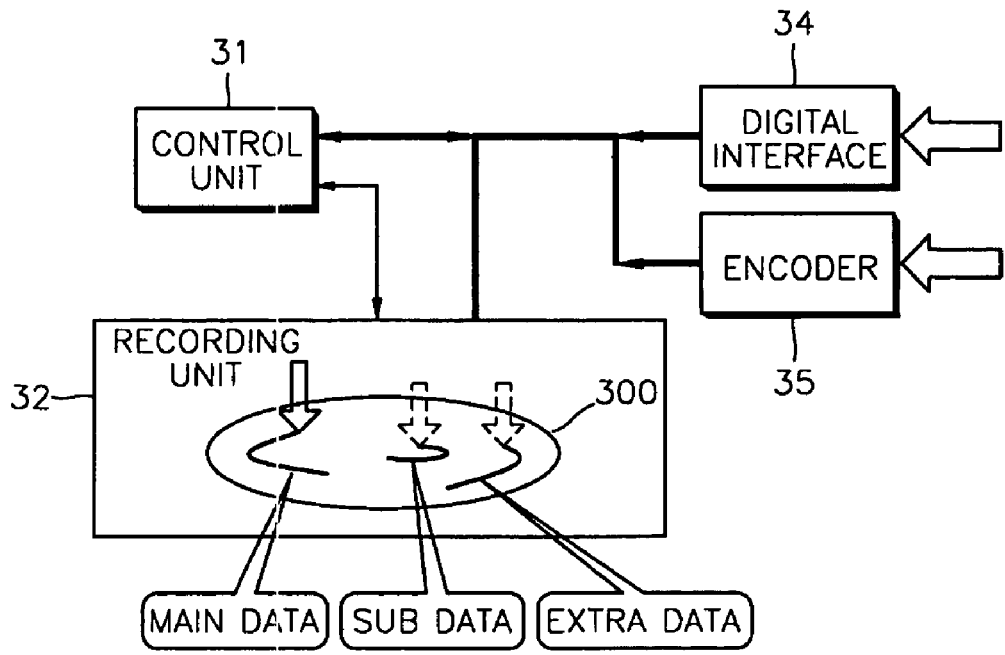
FIG. 3 is a block diagram of a recording apparatus according to a preferred embodiment of the present invention.

FIG. 3 is a block diagram of a preferred embodiment of a recording apparatus according to the present invention. The recording apparatus according to the present invention may be an apparatus used by a manufacturer in the production of an optical disc such as DVDs, or an apparatus used by general users to record desired multimedia contents.

Referring to FIG. 3, the recording apparatus includes a control unit 31, a recording unit 32, a digital interface 34, and an encoder 35. Here, the digital interface 34 is for receiving external digital signals, for example, for receiving multimedia data including main data (and additional data), through a network. The encoder 35 receives and encodes main data or additional data, and transmits the coded main data or additional data to the recording unit 32. The recording apparatus may include only the digital interface 34 or the encoder 35 if necessary.

The recording unit 32 records the main data input from the digital interface 34 or the encoder 35 and additional data including sub data and/or extra data in separate bitstreams in an optical disc 300.

The control unit 31 generates navigation information defining the relation between the main date, the sub data and/or extra data and transmits the navigation information to the recording unit 32. The recording unit 32 also records the navigation information in a predetermined area of the optical disc 300. In a recording operation, the recording unit 32 radiates a laser beam onto the optical disc 300 through an optical pickup (not shown) based upon the control signal from the control unit 32.

In particular, all data are recorded to form a contiguous data area (CDA) to ensure normal reading and reproduction by a reproducing apparatus. In other words, data are recorded to ensure that a decoder can continuously supply data oven when data reading is temporarily interrupted by movement of an optical head of an optical pickup in the reproducing apparatus.

Figure 4:
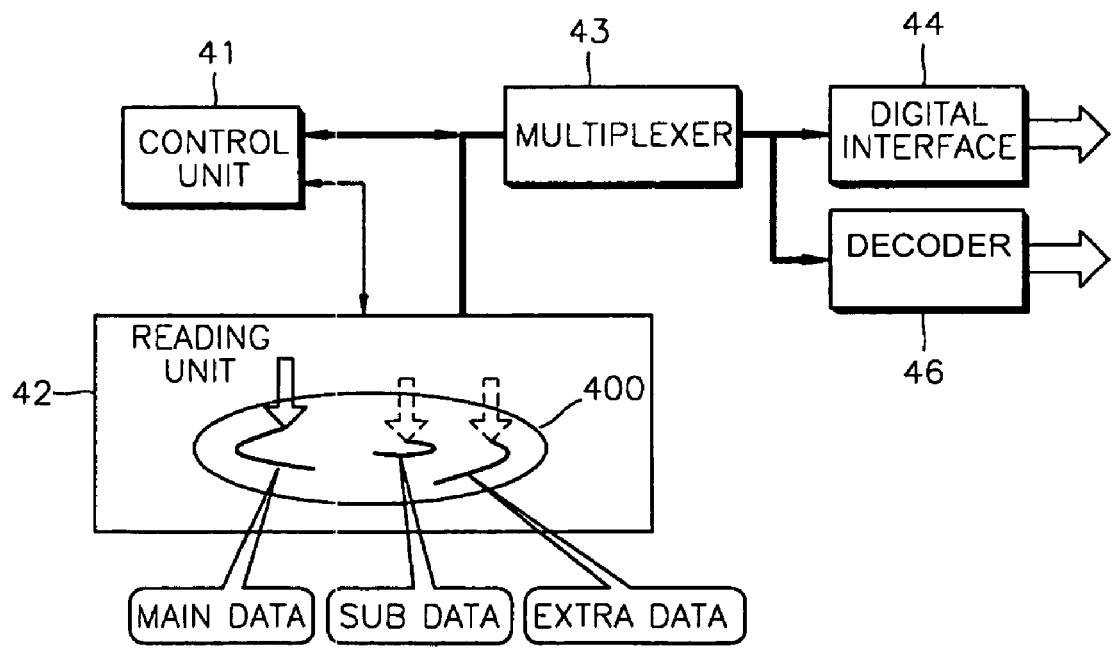
FIG. 4 is a block diagram of a reproducing apparatus according to a preferred embodiment of the present invention.

FIG. 4 is a block diagram of a preferred embodiment of a reproducing apparatus according to the present invention. The reproducing apparatus may be an apparatus used by general users to reproduce desired multimedia contents. Referring to FIG. 4, the reproducing apparatus includes a control unit 41, a reading unit 42, a multiplexer 43, a digital interface 44, and a decoder 46. Here, the digital interface 44 is for externally transferring a digital signal, for example, transferring multimedia data including main data (and additional data) through a network. The decoder 46 decodes main data and/or additional data, which have been encoded and written, and read by the reading unit 42, and outputs the decoded main data or additional data to an output device, such as speakers or monitors (not shown). The reproducing apparatus may include only the digital interface 44 or the decoder 45 if necessary.

The reading unit 42 reads data recorded in an optical disc 400 by radiating a laser beam onto the optical disc 400 through an optical pickup based upon the control signal from the controller 42 and by converting the laser beam reflected from the optical disc 300 to an electrical signal. The reading unit 42 simultaneously reads the main data and the additional data including the sub data and/or extra data and transmits the read data to the multiplexer 43. The read bitstreams may be a combination of main data, sub data, and extra data, a combination of main data and sub data, and a combination of main data and extra data, a combination of sub data and extra data, etc. When at least two bitstreams are simultaneously read, an optical pickup of the reading unit 42 alternately reads the multiple bitstreams. The reading unit 42 has a buffering function so that it can continuously supply data to the decoder 46 even when date reading is temporarily interrupted in a reproducing operation by movement of an optical head of the optical pickup.

The multiplexer 43 multiplexes the main data, the sub data, and/or the extra data, which have been separately received, based upon the navigation information. The multiplexer 43 can replace one component of main data with separate sub data and/or extra data. For example, if main data is a video title in which video data, audio data and/or extra data are multiplexed, the audio data and/or caption data can be replaced with corresponding sub data. A multiplexed bitstream output from the multiplexer 43 is externally transferred through the digital interface 44 or is decoded by the decoder 46.

Figure 5:
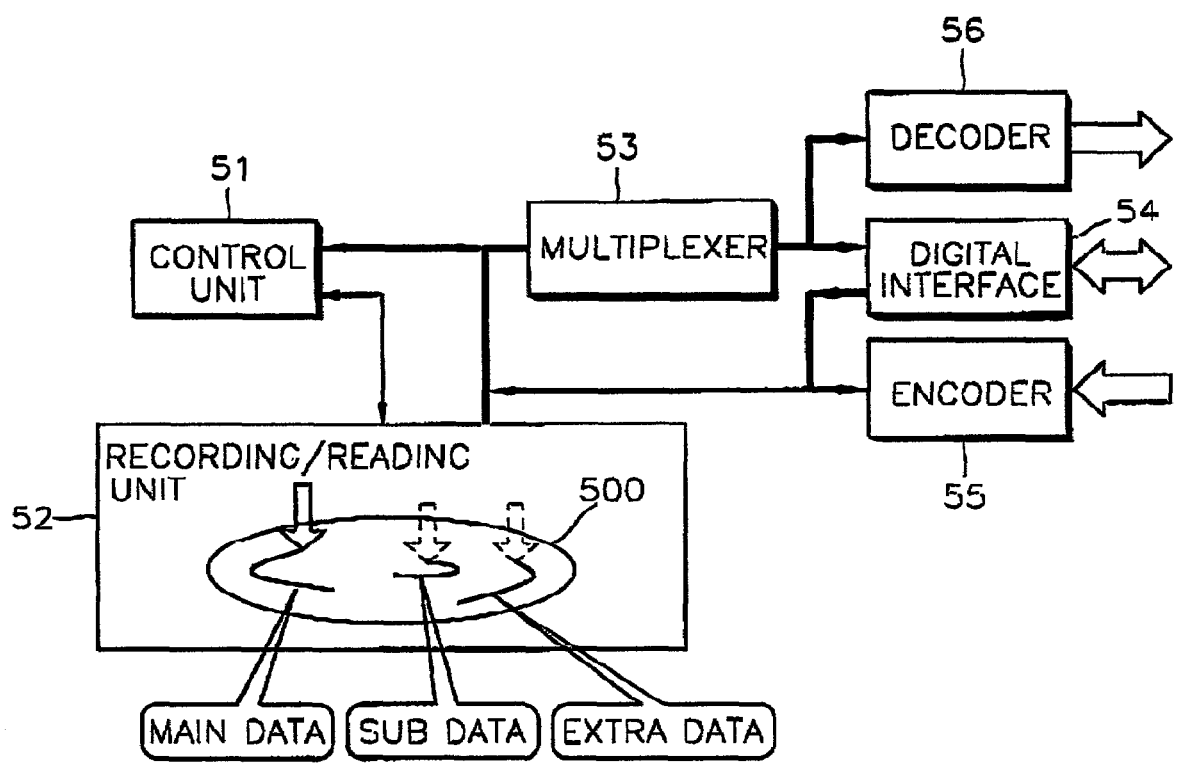
FIG. 5 is a block diagram of a recording and reproducing apparatus according to a preferred embodiment of the present invention.

FIG. 5 is a block diagram of a preferred embodiment of a recording and reproducing apparatus according to the present invention. The recording and reproducing apparatus may be an apparatus used by general users to record or reproduce desired multimedia contents.

Referring to FIG. 5, the recording and reproducing apparatus includes a controller 51, a recording/reading unit 52, a multiplexer 53, a digital interface 54, an encoder 55, and a decoder 56. Here, the digital interface 54 is for externally receiving or transferring a digital signal, for example, receiving or transferring multimedia data including main data (and additional data) through a network The encoder 55 receives and encodes main data or additional data, and transmits the coded main data or additional data to the recording/reading unit 52. The recording and reproducing apparatus may include only the digital interface 54 or only the encoder 55 and the decoder 56 if necessary.

Here, the multiplexer 53, the encoder 55, and the decoder 56 have the same functions as those of the recording apparatuses and the reproducing apparatuses described above with reference to FIGS. 3 and 4. The recording/reading unit 52 has the functions of both the recording unit 32 of the recording apparatus described with reference to FIG. 3 and the reading unit 42 of the reproducing apparatus described with reference to FIG. 4. Also, the control unit 51 has the functions of both the control unit 31 of the recording apparatus and the control unit 41 of the reproducing apparatus. Therefore, explanations of the functions described above a will not be repeated here.

Preferred embodiments of the recording and reproducing methods according to the present invention used by the recording and reproducing apparatuses which have the structures described above, will now be described.

Figure 6:
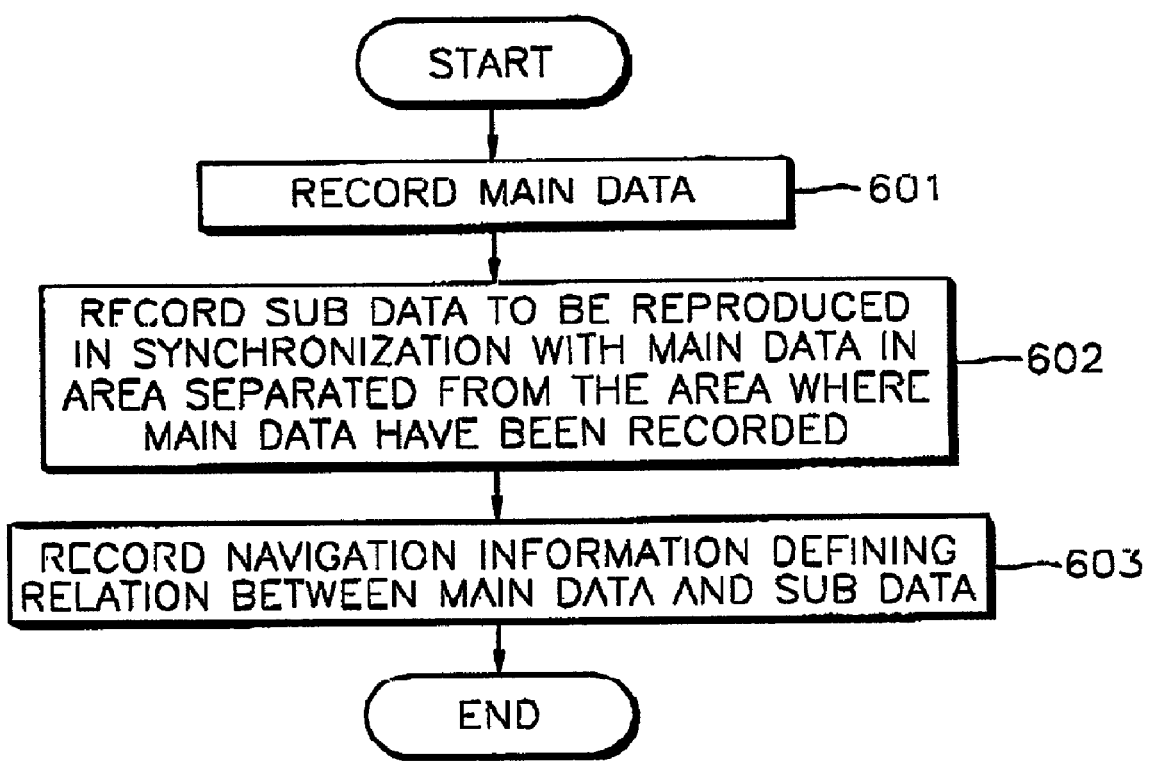
FIG. 6 is a flowchart illustrating a preferred embodiment of a recording method according to the present invention.

FIG. 6 is a flowchart illustrating a preferred embodiment of a recording method according to the present invention. Referring to FIG. 6, when main data are input from the digital interface 34 or the encoder 35 of the recording apparatus, the recording unit 32 records the main data in the optical disc 300 (step 601). Next, sub data to be reproduced in synchronization with the main data are recorded in an area separated from the area where the main data have been recorded (step 602). Navigation information defining the relation between the main data and the sub data are recorded in the optical disc 300 (step 603). Here, the main data and the sub data can be recorded simultaneously by alternation or in a predetermined sequential order.

Figure 7:
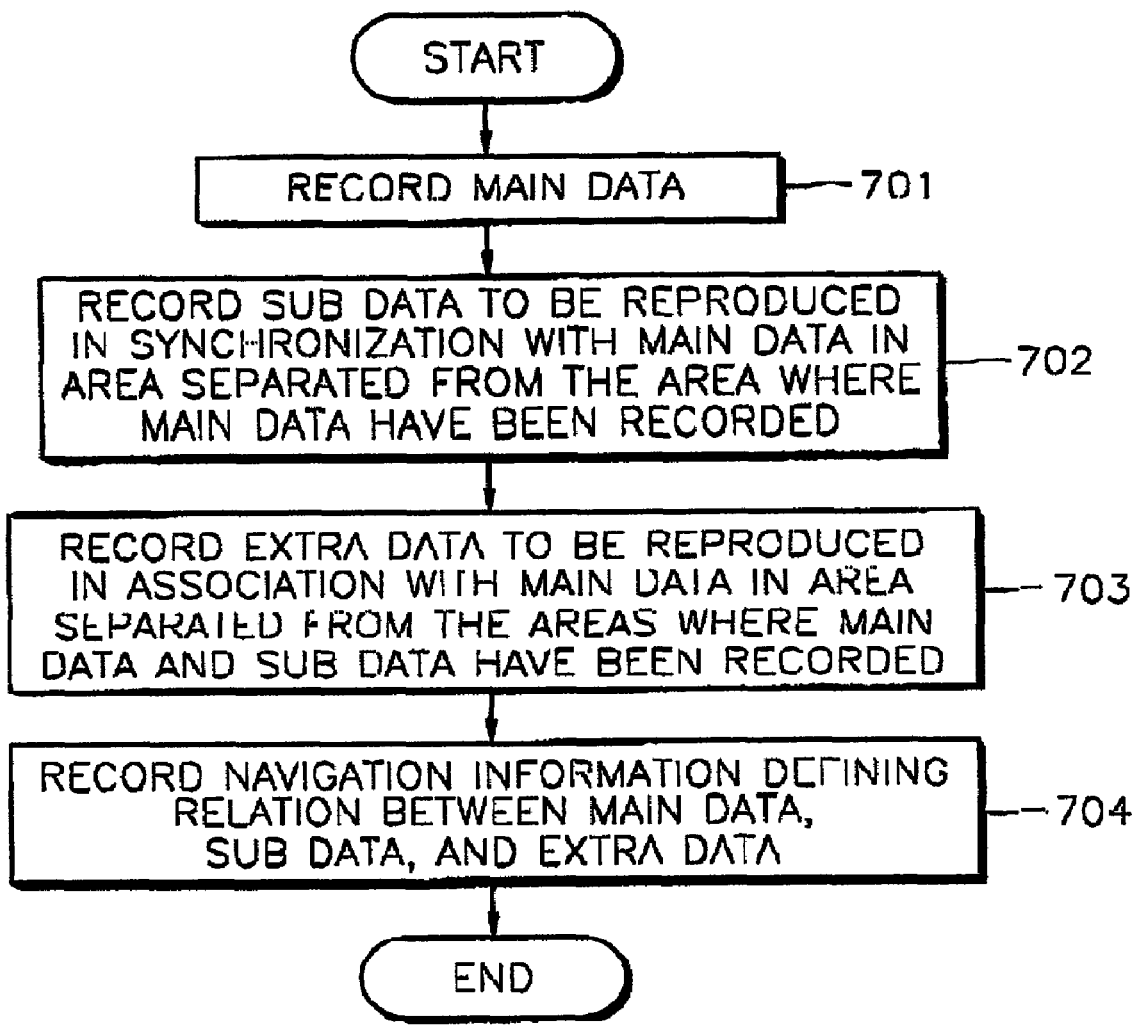
FIG. 7 is a flowchart illustrating another preferred embodiment of the recording method according to the present invention.

FIG. 7 is a flowchart illustrating another embodiment of the recording method according to the present invention. Referring to FIG. 7, when main data are input from the digital interface 34 or the encoder 35 of the recording apparatus, the recording unit 32 records the main data (step 701). Next, sub data to be reproduced in synchronization with the main data are recorded in an area separated from the area where the main data have been recorded (step 702). Extra data are recorded in an area separated from the areas where the main data and the sub data have been recorded (step 703). Navigation information defining the relation between the main data, the sub data, and the extra data are recorded (step 704). Here, the main data, the sub data, and the extra data can be recorded simultaneously by alternation or in a predetermined sequential order.

Figure 8:
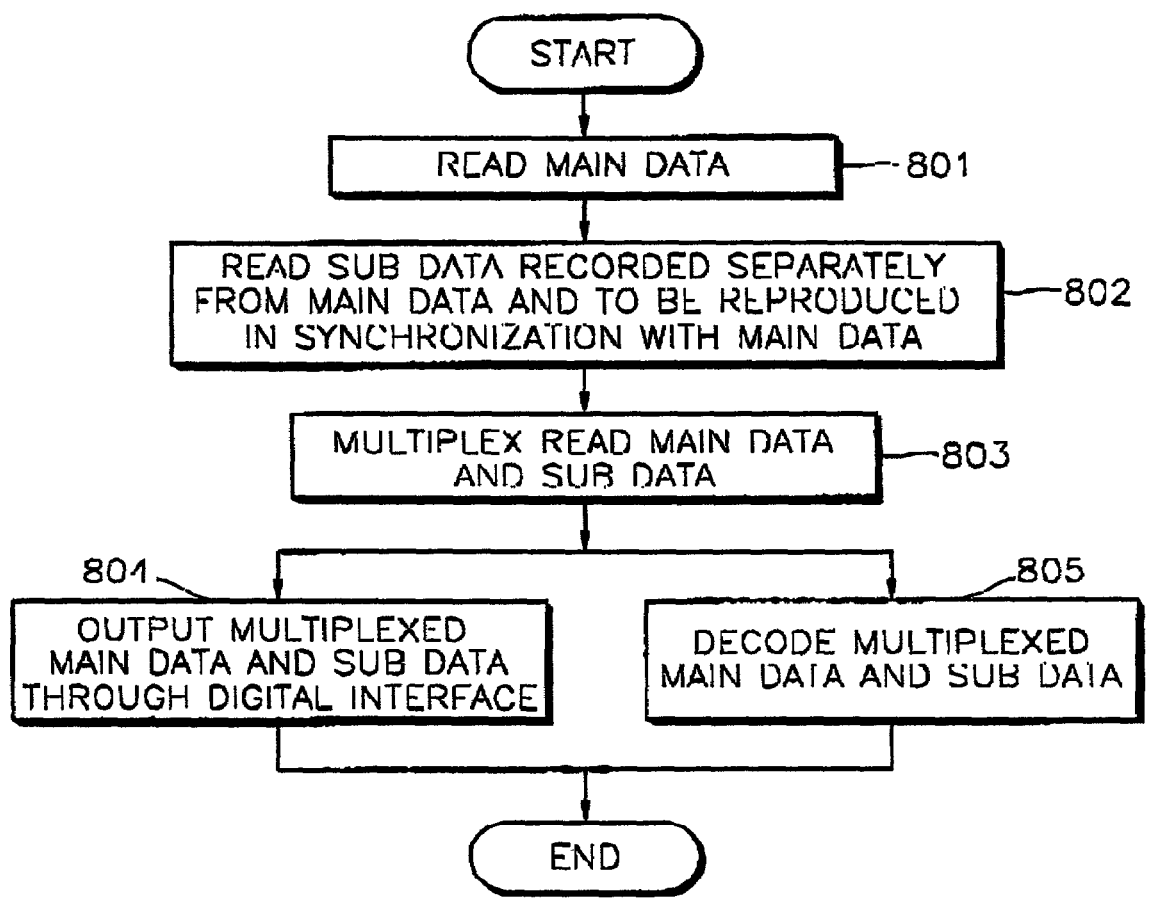
FIG. 8 is a flowchart illustrating a preferred embodiment of the reproducing method according to the present invention.

FIG. 8 is a flowchart illustrating a preferred embodiment of a reproducing method according to the present invention. Referring to FIG. 8, the reading unit 42 of the reproducing apparatus or the recording/reading unit 52 of the recording and reproducing apparatus reads main data from the optical disc 400 or 500 (step 801). Next, sub data are read from an area separated from the area where the main data are recorded (step 802). The multiplexer 43 or 53 multiplexes the read main data and sub data (step 803). Here, necessary navigation information is read by the reading unit 42 or the recording/reading unit 52, and transmitted to the control unit 41 or 51, and then to the multiplexers 43 or 53 after being analyzed by the control unit 41 or 51. Alternatively, the navigation information read by the reading unit 42 or the recording/reading unit 52 can be transmitted directly to the multiplexer 43 or 53.

The multiplexed main data and sub data are output through the digital interface 44 or 54 (step 804), or are transmitted to and decoded by the decoder 46 or 56 (step 805). The decoded main data and sub data are transmitted to and reproduced through an output device such as a speaker, a monitor, or a printer.

Figure 9:
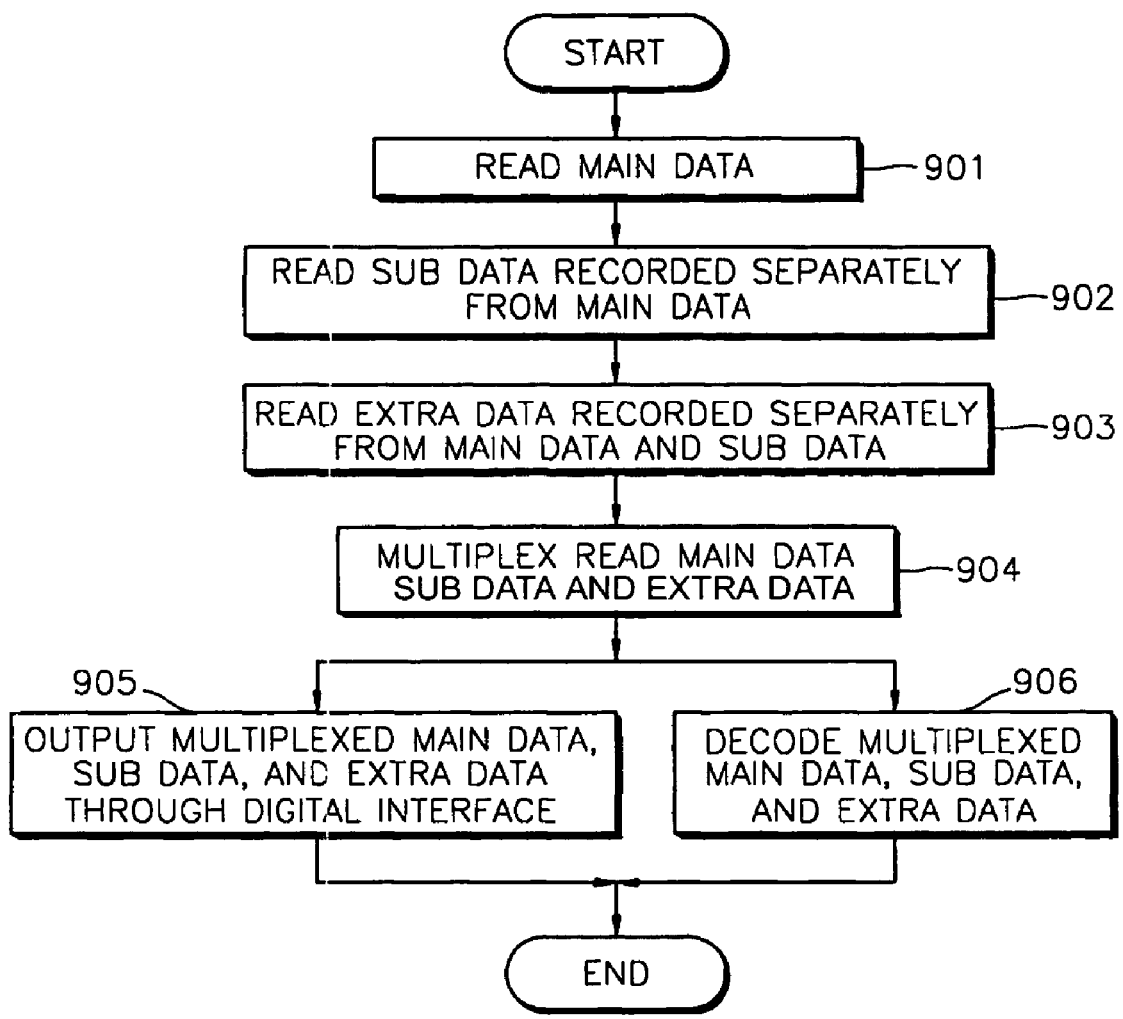
FIG. 9 is a flowchart illustrating another preferred embodiment of the reproducing method according to the present invention.

FIG. 9 is a flowchart illustrating another embodiment of the reproducing method according to the present invention. Referring to FIG. 9, the reading unit 42 of the reproducing apparatus or the recording/reading unit 52 of the recording and reproducing apparatus reads main data from the optical disc 400 or 500 (step 901). Next, sub data are read from an area separated from the area where the main data are recorded (step 902). Extra data are read from an area separated from the areas where the main data and the sub data are recorded (step 903). The multiplexor 43 or 53 multiplexes the read main data, sub data, and extra data (step 904). Here, necessary navigation information is read by the reading unit 42 or the recording/reading unit 52, and transmitted to the control unit 41 or 51, and then to the multiplexers 43 or 53 after being analyzed by the control unit 41 or 51. Alternatively, the navigation information read by the reading unit 42 or the recording/reading unit 52 can be transmitted directly to the multiplexer 43 or 53.

The multiplexed main data, sub data, and extra data are output through the digital interface 44 or 54 (step 906), or are transmitted to and decoded by the decoder 46 or 56 (step 906). The decoded main data, sub data, and extra data are transmitted to and reproduced through an output device such as a speaker, a monitor, or a printer.

Figure 10:
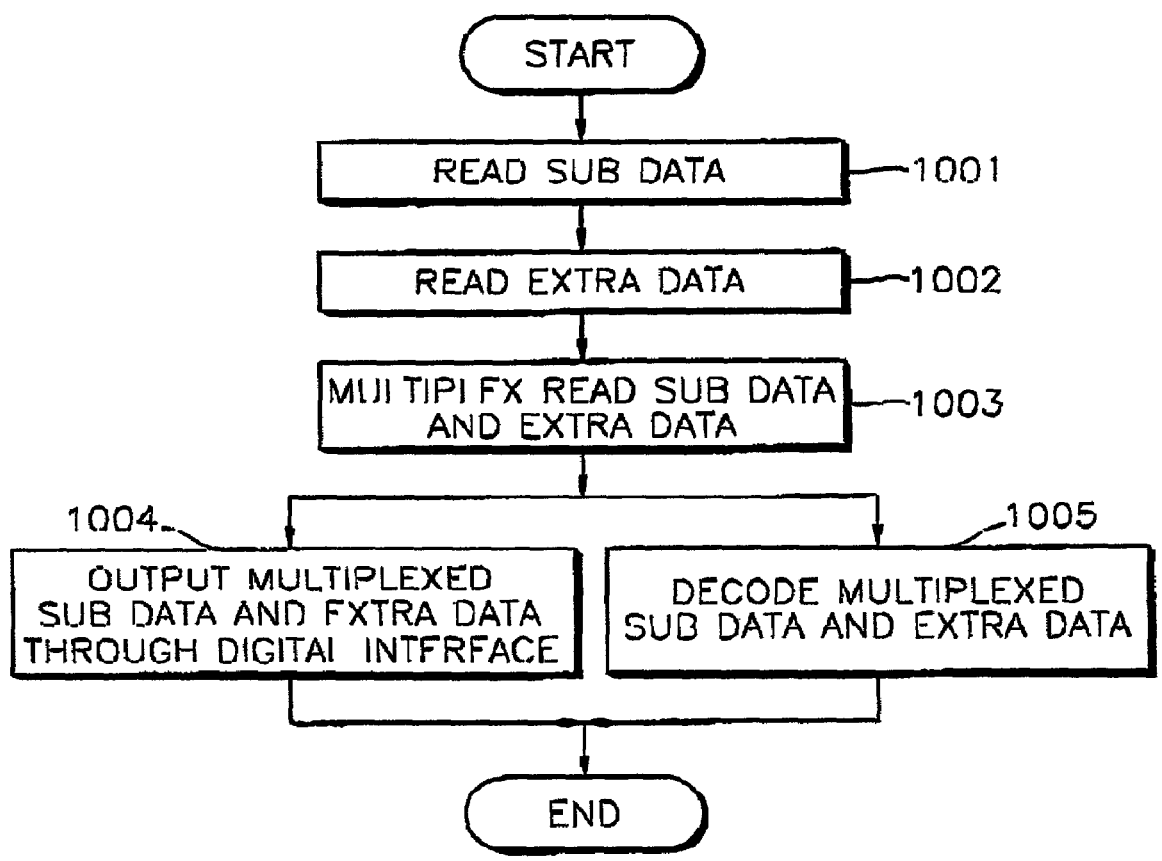
FIG. 10 is a flowchart illustrating still another preferred embodiment of the reproducing method according to the present invention.

FIG. 10 is a flowchart illustrating still another embodiment of the reproducing method according to the present invention. Referring to FIG. 10, the reading unit 42 of the reproducing apparatus or the recording/reading unit 52 of the recording and reproducing apparatus reads sub data from the optical disc 400 or 500 (step 1001). Next, extra data are read from an area separated from the area where the sub data are recorded (step 1002). The multiplexer 43 or 53 multiplexes the read sub data and extra data (step 1003). Here, necessary navigation information is read by the reading unit 42 or the recording/reading unit 52, and transmitted to the control unit 41 or 51, and then to the multiplexers 43 or 53 after being analyzed by the control unit 41 or 51. Alternatively, the navigation information read by the reading unit 42 or the recording/reading unit 52 can be transmitted directly to the multiplexer 43 or 53.

The multiplexed sub data and extra data are output through the digital interface 44 or 54 (step 1004), or are transmitted to and decoded by the decoder 46 or 56 (step 1005). The decoded sub data and extra data are transmitted to and reproduced through an output device such as a speaker, a monitor, or a printer.

As described above, the present invention provides a data storage medium in which different kinds of data constituting multimedia contents are recorded in discrete bitstreams for easy data editing or replacement, and a recording apparatus and method for the same. The present invention also provides an apparatus and method for simultaneously reading and reproducing multiple bitstreams.

It is expected that there will be more types of multimedia data services in the future to satisfy a variety of needs of users. A variety of multimedia contents will be provided by multimedia service providers through networks. The present invention enables users to receive a variety of multimedia contents from multimedia service providers and to create a new multimedia content by data replacement or editing if necessary.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A data storage medium comprising:
   main data including audio data and/or video data;
   sub data recorded in a separate bitstream from the main data to be reproduced in synchronization with the main data by a reproducing apparatus; and
   navigation information defining a relation required for the main data and the sub data to be output in synchronization with each other by the reproducing apparatus;
   wherein:
      the navigation information comprises:
         an identifier to identify a particular bitstream of the main data; and
         playback time information for the sub data corresponding to the main data; and
      the main data, the sub data, and the navigation information are asynchronously recorded.

2. The data storage medium of claim 1, further comprising extra data recorded in a separate bitstream from the main data and the sub data to be reproduced in connection with the main data by the reproducing apparatus;
   wherein:
      the navigation information further defines a relation required for the main data and the extra data to be output in synchronization with each other by the reproducing apparatus, and further comprises playback time information for the extra data corresponding to the main data;
   the main data, the sub data and the extra data are recorded simultaneously by alternation or in a predetermined sequential order in different areas on the data storage medium; and
   the main data, the sub data, the extra data, and the navigation information are asynchronously recorded.

3. The data storage medium of claim 2, wherein the main data is received and encoded by an internal encoder or input through a digital interface, and recorded on the data storage medium.

4. The data storage medium of claim 2, wherein the sub data and/or the extra data are received and encoded by an internal encoder or input through the digital interface, and recorded on the data storage medium.

5. The data storage medium of claim 1, wherein the data storage medium is an apparatus-readable medium that is readable by the reproducing apparatus.

6. A recording method comprising:
   recording main data including audio data and/or video data;
   recording sub data to be reproduced in synchronization with the main data in a separate bitstream from the main data; and
   recording navigation information defining a relation required for the main data and the sub data to be reproduced in synchronization with each other;
   wherein:
      the navigation information comprises:
         an identifier to identify a particular bitstream of the main data; and
         playback time information for the sub data corresponding to the main data; and
      the main data, the sub data, and the navigation information are asynchronously recorded.

7. The recording method of claim 6, further comprising:
   recording extra data to be reproduced in connection with the main data in a separate bitstream from the main data and the sub data;
   recording navigation information defining a relation required for the main data and the extra data to be output in connection with each other;
   wherein:
      the navigation information further comprises playback time information for the extra data corresponding to the main data;
      the main data, the sub data and the extra data are recorded simultaneously by alternation or in a predetermined sequential order in different areas on the data storage medium; and
      the main data, the sub data, the extra data, and the navigation information are asynchronously recorded.

8. The recording method of claim 6, wherein the recording of the main data comprises:
   receiving the main data through a digital interface; and
   recording the received main data.

9. The recording method of claim 6, wherein the recording of the main data comprises:
   receiving the main data as analog signal;
   encoding the received main data; and
   recording the encoded main data.

10. The recording method of claim 6, wherein the recording of the sub data comprises:
    receiving the sub data through the digital interface; and
    recording the received sub data.

11. The recording method of claim 6, wherein the recording of the sub data comprises:
    receiving the sub data as analog signal;
    encoding the received sub data; and
    recording the encoded sub data.

12. The recording method of claim 7, wherein the recording of the navigation information comprises:
    receiving the extra data through the digital interface; and
    recording the received extra data.

13. The recording method of claim 7, wherein the recording of the navigation information comprises:
    receiving the extra data as analog signal;
    encoding the received extra data; and
    recording the encoded extra data.

14. A reproducing method comprising:
reading main data including audio data and/or video data recorded in a discrete bitstream on a data storage medium;
reading sub data recorded in a separate bitstream from the main data, on the data storage medium, which is reproduced in synchronization with the main data; and
reproducing the read main data and the read sub data based on navigation information defining a relation required for the read main data and the read sub data to be reproduced in synchronization with each other;
wherein:
the navigation information comprises:
an identifier to identify a particular bitstream of the main data; and
playback time information for the read sub data corresponding to the read main data; and
the main data, the sub data, and the navigation information are asynchronously recorded.

15. The reproducing method of claim 14, further comprising outputting the reproduced main data and sub data through a digital interface.

16. The reproducing method of claim 14, further comprising decoding the reproduced main data and sub data.

17. The reproducing method of claim 14, wherein the reproducing of the read main data and the read sub data comprises:
reading the navigation information defining a relation required for the read main data and sub data to be reproduced in synchronization with each other; and
reproducing the read main data and the read sub data based on the navigation information.

* * * * *